(12) United States Patent
Morse et al.

(10) Patent No.: US 9,305,297 B2
(45) Date of Patent: Apr. 5, 2016

(54) SECURE ONLINE COMMUNICATION THROUGH A WIDGET ON A WEB PAGE

(71) Applicant: KIMBIA, INC., Austin, TX (US)

(72) Inventors: Thon Morse, Austin, TX (US); Nathaniel B. Forman, Austin, TX (US); Richard J. Stanford, Austin, TX (US)

(73) Assignee: KIMBIA, INC., Austin, TX (US)

( * ) Notice: Subject to any disclaimer, the term of this patent is extended or adjusted under 35 U.S.C. 154(b) by 0 days.

(21) Appl. No.: 14/818,459

(22) Filed: Aug. 5, 2015

(65) Prior Publication Data
US 2015/0348020 A1  Dec. 3, 2015

Related U.S. Application Data

(63) Continuation of application No. 12/250,880, filed on Oct. 14, 2008, now Pat. No. 8,370,749, and a continuation of application No. 13/722,786, filed on Dec. 20, 2012.

(51) Int. Cl.
G06F 3/00 (2006.01)
G06Q 20/38 (2012.01)
H04L 29/08 (2006.01)
H04L 29/06 (2006.01)
G06F 3/01 (2006.01)

(52) U.S. Cl.
CPC .............. *G06Q 20/382* (2013.01); *H04L 63/04* (2013.01); *H04L 67/02* (2013.01); *H04L 67/1085* (2013.01); *H04L 67/42* (2013.01)

(58) Field of Classification Search
CPC ...... G06Q 20/382; H04L 67/02; H04L 67/42; H04L 67/04; H04L 67/1085
See application file for complete search history.

(56) References Cited

U.S. PATENT DOCUMENTS

| 6,167,411 | A | 12/2000 | Narayanaswamy |
| 6,546,419 | B1 | 4/2003 | Humpleman et al. |
| 7,039,671 | B2 | 5/2006 | Cullen |
| 7,089,583 | B2 | 8/2006 | Mehra et al. |
| 7,487,464 | B2 | 2/2009 | Grotjohn et al. |
| 7,565,332 | B2 | 7/2009 | Williams et al. |
| 7,743,336 | B2 | 6/2010 | Louch et al. |
| 7,865,308 | B2 | 1/2011 | Athsani et al. |
| 7,945,774 | B2 | 5/2011 | Ganesan |
| 8,560,840 | B2 | 10/2013 | Williams et al. |

(Continued)

OTHER PUBLICATIONS

U.S. Appl. No. 13/722,786, filed Dec. 20, 2012, Non-Final Office Action dated Dec. 15, 2014.

(Continued)

*Primary Examiner* — Nicholas Augustine
(74) *Attorney, Agent, or Firm* — Brian F. Russell; Russell Ng PLLC

(57) ABSTRACT

A client device requests a web page via a network, where the web page is identified by an identifier and references a widget. Following receipt of the requested web page, the client device requests the widget referenced by the requested web page and presents, within the requested web page, a presentation of the widget. Thereafter, in response to receiving user information within the presentation of the widget, the client device communicates the user information to a server via a secure connection between the widget on the client device and the server while maintaining user context at the client device in the requested web page, where the secure connection is initiated by the client device and employs a secure communication protocol implemented by the widget.

30 Claims, 8 Drawing Sheets

(56) References Cited

U.S. PATENT DOCUMENTS

| | | |
|---|---|---|
| 8,595,186 B1 | 11/2013 | Mandyam et al. |
| 2003/0071860 A1 | 4/2003 | Goddard et al. |
| 2003/0158898 A1 | 8/2003 | Hirota et al. |
| 2003/0164859 A1 | 9/2003 | Evan |
| 2004/0083178 A1 | 4/2004 | Tanaka et al. |
| 2004/0218451 A1 | 11/2004 | Said et al. |
| 2005/0075975 A1 | 4/2005 | Rosner et al. |
| 2005/0076306 A1 | 4/2005 | Martin et al. |
| 2005/0193368 A1 | 9/2005 | Becker et al. |
| 2006/0167765 A1 | 7/2006 | Lacey et al. |
| 2006/0168536 A1 | 7/2006 | Portman |
| 2006/0212390 A1 | 9/2006 | Gruber |
| 2006/0230135 A1 | 10/2006 | Wolfston et al. |
| 2006/0290709 A1 | 12/2006 | Omi et al. |
| 2008/0010112 A1 | 1/2008 | Kniaz et al. |
| 2008/0021775 A1 | 1/2008 | Lerman et al. |
| 2008/0040681 A1 | 2/2008 | Synstelien et al. |
| 2008/0097830 A1 | 4/2008 | Kim |
| 2008/0097871 A1 | 4/2008 | Williams et al. |
| 2008/0097906 A1 | 4/2008 | Williams et al. |
| 2008/0098289 A1 | 4/2008 | Williams et al. |
| 2008/0098290 A1 | 4/2008 | Williams et al. |
| 2008/0098325 A1 | 4/2008 | Williams et al. |
| 2008/0104496 A1 | 5/2008 | Williams et al. |
| 2008/0215879 A1 | 9/2008 | Williams et al. |
| 2008/0222039 A1 | 9/2008 | Gutierrez-Sheris |
| 2008/0235123 A1 | 9/2008 | Olliphant et al. |
| 2008/0263462 A1 | 10/2008 | Mayer-Ullmann et al. |
| 2008/0270909 A1 | 10/2008 | Kaufman et al. |
| 2008/0301046 A1 | 12/2008 | Martinez et al. |
| 2009/0144066 A1 | 6/2009 | Van Luchene et al. |
| 2009/0249359 A1 | 10/2009 | Caunter et al. |
| 2009/0254745 A1 | 10/2009 | Ganesan |
| 2010/0138295 A1 | 6/2010 | Caron et al. |
| 2012/0054050 A1 | 3/2012 | Ziegler et al. |

OTHER PUBLICATIONS

U.S. Appl. No. 12/250,880, filed Oct. 14, 2008, Non-Final Office Action dated Oct. 7, 2011.

U.S. Appl. No. 12/250,880, filed Oct. 14, 2008, Final Office Action dated Mar. 19, 2012.

U.S. Appl. No. 12/250,880, filed Oct. 14, 2008, Non-Final Office Action dated Aug. 30, 2012.

U.S. Appl. No. 12/250,880, filed Oct. 14, 2008, Notice of Allowance dated Dec. 5, 2012.

U.S. Appl. No. 12/250,880, filed Oct. 14, 2008, Supplemental Notice of Allowability dated Jan. 4, 2013.

SECURE ONLINE COMMUNICATION THROUGH A WIDGET ON A WEB PAGE

The present application is a continuation of U.S. patent application Ser. No. 13/722,786, filed Dec. 20, 2012, which is a continuation of U.S. patent application Ser. No. 12/250,880, now U.S. Pat. No. 8,370,749, filed Oct. 14, 2008. The disclosure of these application is hereby incorporated herein by reference in its entirety for all purposes.

BACKGROUND OF THE INVENTION

1. Technical Field

The present invention relates in general to network technology, and in particular, to secure online communication through a widget in a web page.

2. Description of the Related Art

FIG. 1 is a high level block diagram of a prior art network environment 100 in which online financial payments are made. In the depicted example, network environment 100 includes a network 102, which can include one or more wired and/or wireless public and/or private networks, such as corporate intranet(s) and/or public networks such as the Internet. Coupled to network 102 are at least one company server 104 belonging to an organization, such as a for-profit or not-for-profit business or association, and a separate payment server 106. Company server 104 and payment server 106 are accessed on network 102 via different Internet Protocol (IP) service addresses. In various implementations, payment server 106 may belong to the same organization that operates company server 104 or may alternatively belong to an application service provider that provides payment services on behalf of one or more other organizations (e.g., in exchange for a percentage of the payments received).

Network environment 100 further includes a client device 108, such as a personal computer, laptop computer, mobile phone or other computing device. Client device 108 executes a browser 110 through which a user can access various web pages via network 102.

As further illustrated in FIG. 1, company server 104 hosts a web page 120 containing a sub-window 122 through which the user of client device 108 may initiate financial payments utilizing browser 110. The financial payments can be made in exchange for goods or services or can simply be donations. Payment server 106 hosts a secure payment web page 130 through which financial payments initiated in sub-window 122 are completed. The security of payment web page 130, which is provided through the use of a secure communication protocol such as Hypertext Transfer Protocol over Secure Socket Layer (HTTPS), is indicated in FIG. 1 by shading.

In operation, a user at a client device 108 accesses web page 120 on company server 104 utilizing browser 110. In order to make a financial payment, the user first interacts with sub-window 122, for example, by activating a payment control (e.g., a payment button). The user may also optionally enter personal or transaction-related information within sub-window 122 or a different pop-up window invoked by interaction with sub-window 122. When all required personal and/or transaction-related information is entered, the user may provide a further input, such as selection of a "submit" button, to signify readiness to actually complete the financial payment.

In response to receipt of the input signifying user readiness to complete the financial payment, sub-window 122 or a pop-up window spawned by sub-window 122 redirects browser 110 to a secure payment web page 130 hosted on payment service server 106, as indicated by arrow 124. In performing the redirection, sub-window 122 also transmits the user-entered personal or transaction-related information, if any, to secure payment web page 130.

Following the redirection to payment web page 130, the user completes the financial payment by interacting with payment web page 130 on payment service server 106. For example, the user may enter credit card information or bank account and routing information in payment web page 130 in order to complete the financial payment. Payment server 106 typically confirms completion of the financial payment by the user by serving to browser 110 a different confirmation page (not illustrated).

When making an online financial payment such as that described above, users have two primary concerns, namely, security and authenticity. Security is a concern because users do not want their private personal or financial information intercepted and misused. Authenticity is also a concern because users want payments to be received by the intended recipient rather than an unknown third party. The conventional payment infrastructure described above attempts to address these concerns through authentication with a "trusted" third party that is presumed to be viewed as reliable by users. In many cases, the "trusted" third party provides a badge or seal that is embedded in sub-window 122 and/or a window spawned by sub-window 122. Users can allay concerns regarding the authenticity of the party hosting sub-window 122 by clicking on the badge or seal to establish communication with the "trusted" third party over network 102 to enable confirmation of the authenticity of the party.

SUMMARY OF THE INVENTION

In at least one embodiment, a client device requests a web page via a network, where the web page is identified by an identifier and references a widget. Following receipt of the requested web page, the client device requests the widget referenced by the requested web page and presents, within the requested web page, a presentation of the widget. Thereafter, in response to receiving user information within the presentation of the widget, the client device communicates the user information to a server via a secure connection between the widget on the client device and the server while maintaining user context at the client device in the requested web page, where the secure connection is initiated by the client device and employs a secure communication protocol implemented by the widget.

BRIEF DESCRIPTION OF THE DRAWINGS

The present invention, as well as a preferred mode of use, will best be understood by reference to the following detailed description of one or more illustrative embodiments when read in conjunction with the accompanying drawings, wherein.

DETAILED DESCRIPTION OF ILLUSTRATIVE EMBODIMENT

Figure 1:
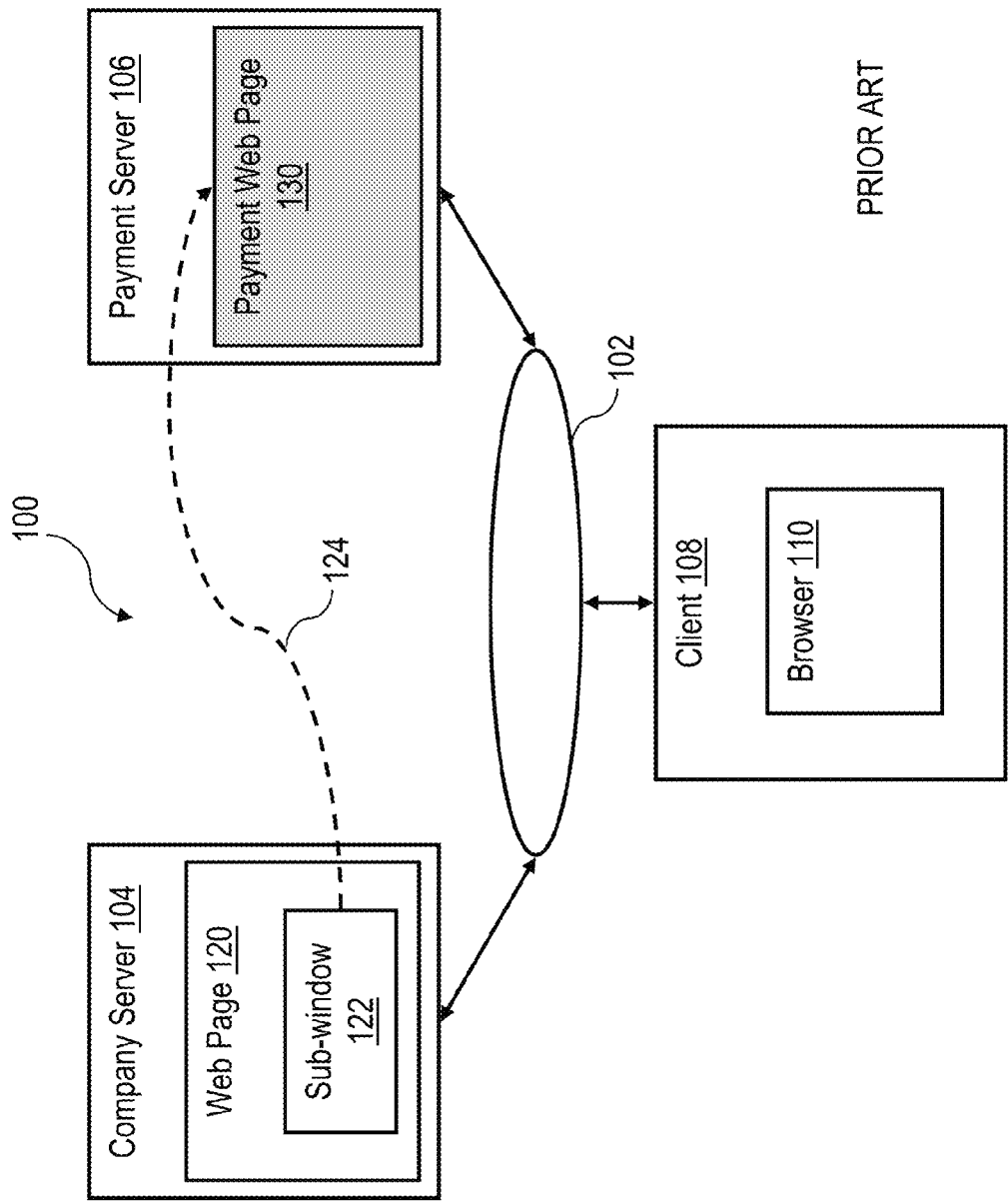
FIG. 1 is high level block diagram of a prior art network environment in which a payment is made online through a web page sub-window that redirects to a third-party payment service server.

In many cases, user concerns regarding security and authenticity when making online payments are not satisfied by prior art solutions, such as that described above with reference to FIG. 1. For example, users are frequently unfamiliar with the "trusted" third party chosen to authenticate the party hosting the payment sub-window 122. Consequently, the use of a badge or seal of the supposedly "trusted" third party does little to allay user concerns, particularly given the fact that badges and seals can be counterfeited. Even supposing users do, in general, trust the "trusted" third party, the extra effort required to verify the hosting party with the "trusted" third party is sufficient to cause at least some users to not complete the payment.

The use of redirection to a third party payment server 106 further diminishes the sense of comfort developed by the user when interacting with prior art web page 120. The redirection causes a different host name or IP service address to be presented by browser 110, signifying to the user that the user's personal and financial information will be transmitted to another, possibly unknown third party. Thus, despite the obvious security provided by payment web page 130, the user's concerns about authenticity are not addressed, and if anything, are exacerbated by the inclusion of yet another party in the process.

Figure 2A:
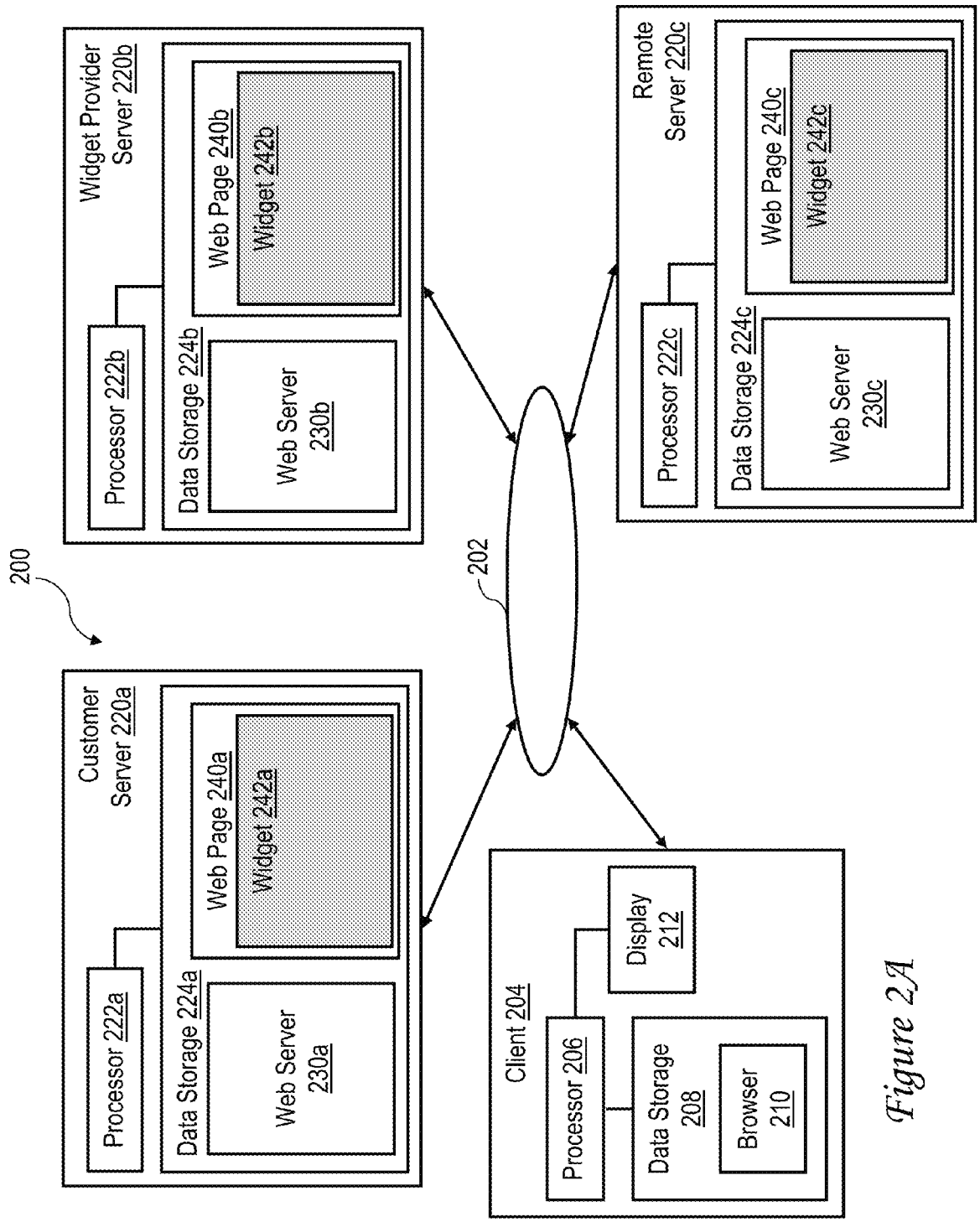
FIGS. 2A-2B depict high level block diagrams of exemplary network environments in which information is communicated through a secure widget in a web.
Figure 2B:
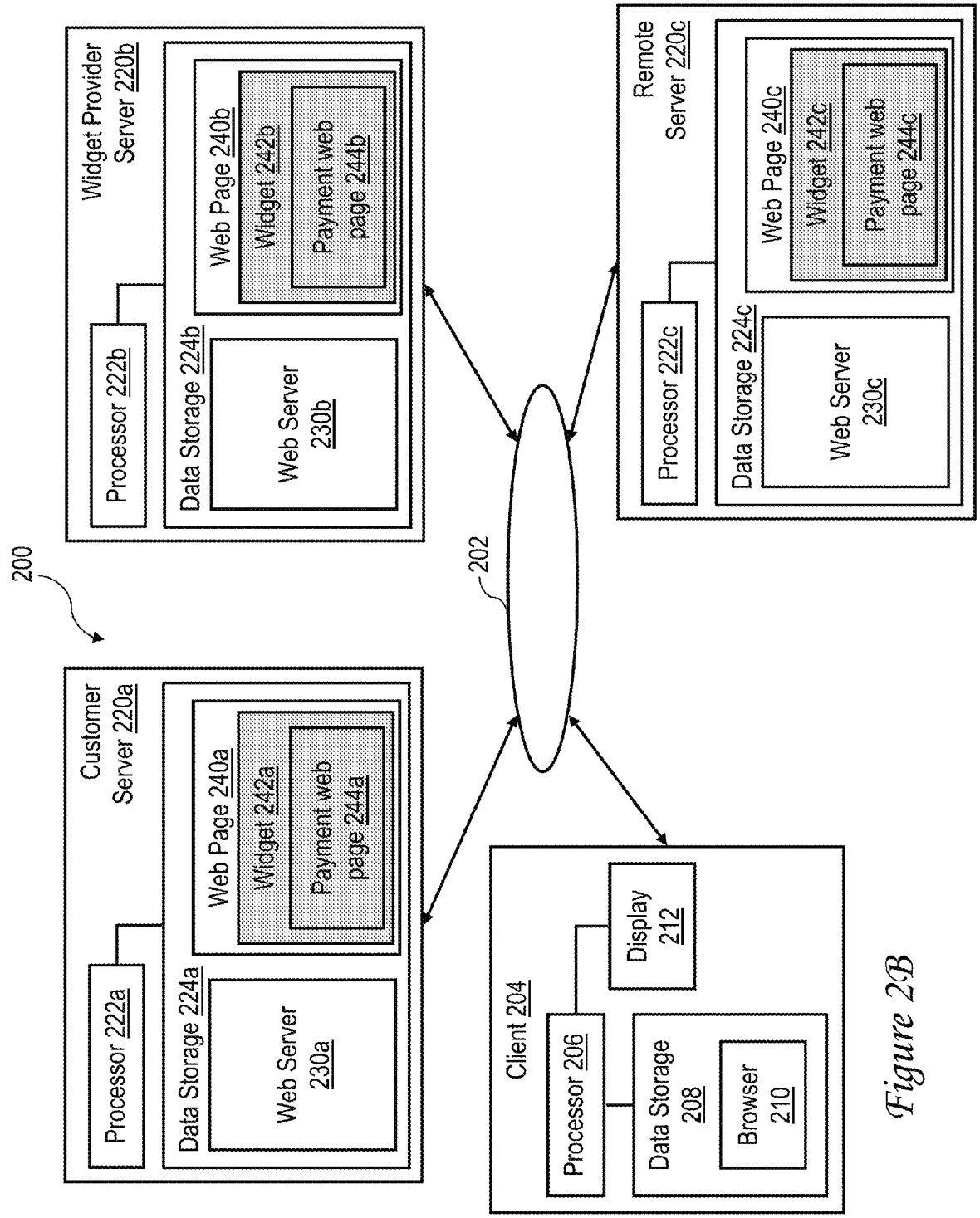

With reference now to FIGS. 2A-2B, there are illustrated high level block diagrams of exemplary network environments in which information is securely communicated through a secure web page widget. In FIGS. 2A-2B, network environment 200 includes a network 202, which can include one or more wired and/or wireless public and/or private networks, such as corporate intranet(s) and/or public network(s) such as the Internet.

A client device 204, for example, a personal computer, laptop computer, mobile phone or other data processing device, is coupled to network 202. Client device 204, which is representative of possibly numerous client devices coupled to network 202, includes a processor 206 (which represents one or more physical processing elements) coupled to a display 212 and to data storage 208 containing, inter alia, a browser 210. Processor 206 executes browser 210, enabling a user to access various web pages via network 202.

Network environment 200 further includes one or more servers, such as customer server 220a, service provider server 220b, and remote server 220c, which are coupled to network 202 for communication. Each of servers 220a-220c is accessed via a different host name or service address (e.g., IP service address) on network 202. As indicated by similar reference numerals, customer server 220a, widget provider server 220b, and remote server 220c can be (but are not necessarily) similarly constructed. In the depicted exemplary embodiment, each of servers 220a, 220b and 220c generally includes a processor 222, which can include one or more physical processor cores, coupled for communication with data storage 224, which can include, for example, volatile and/or non-volatile storage. Although in each case data storage 224 is illustrated in FIGS. 2A-2B as local to its associated processor 222, it will be appreciated that data storage 208 (or at least some of its contents) can be physically remote from the associated processor 222.

In each of servers 220a-220c, data storage 224 includes a web server 210 that serves web pages, such as a web page 240, to client devices over network 202. As will be appreciated, web pages 240a-240c may have differing content, and each may be defined in any current or future developed format including, without limitation, HyperText Markup Language (HTML), eXtensible HTML (XHTML), Wireless Application Protocol (WAP), eXtensible Markup Language (XML), etc. Each of web pages 240a-240c contains a respective one of widgets 242a-242c, which supports secure communication with browser 210 of client device 204. (Secure communication is again indicated in FIGS. 2A-2B by shading). Each widget 242, which is defined herein as a portable chunk of code that can be installed and executed within a web page by an end user without additional compilation, may be implemented, for example, with Dynamic HTML (DHTML), JavaScript, Asynchronous JavaScript and XML (AJAX), and/or Adobe Flash, etc. As shown in FIG. 2B and as discussed further below, the secure communication of widgets 242a-242c can include secure communication of payment information over network 202 via a payment web page 244a, 244b or 244c presented in a window of browser 210 by one of widgets 242a-242c. Depending upon the desired implementation, the presentation of a payment web page 244 may be coextensive with the presentation of the associated widget 242.

In a typical implementation, widget 242 is coded by a widget provider associated with widget provider server 220b. Widget 242 may be developed expressly for a customer or group of customers, such as an individual or for-profit or not-for-profit business or association associated with customer server 220a, or alternatively, may be developed for general distribution. In the illustrated exemplary embodiment, widget 242 has been deployed not only to the widget provider server 220b associated with the widget provider, but also to customer server 220a and remote server 220c.

Figure 3:
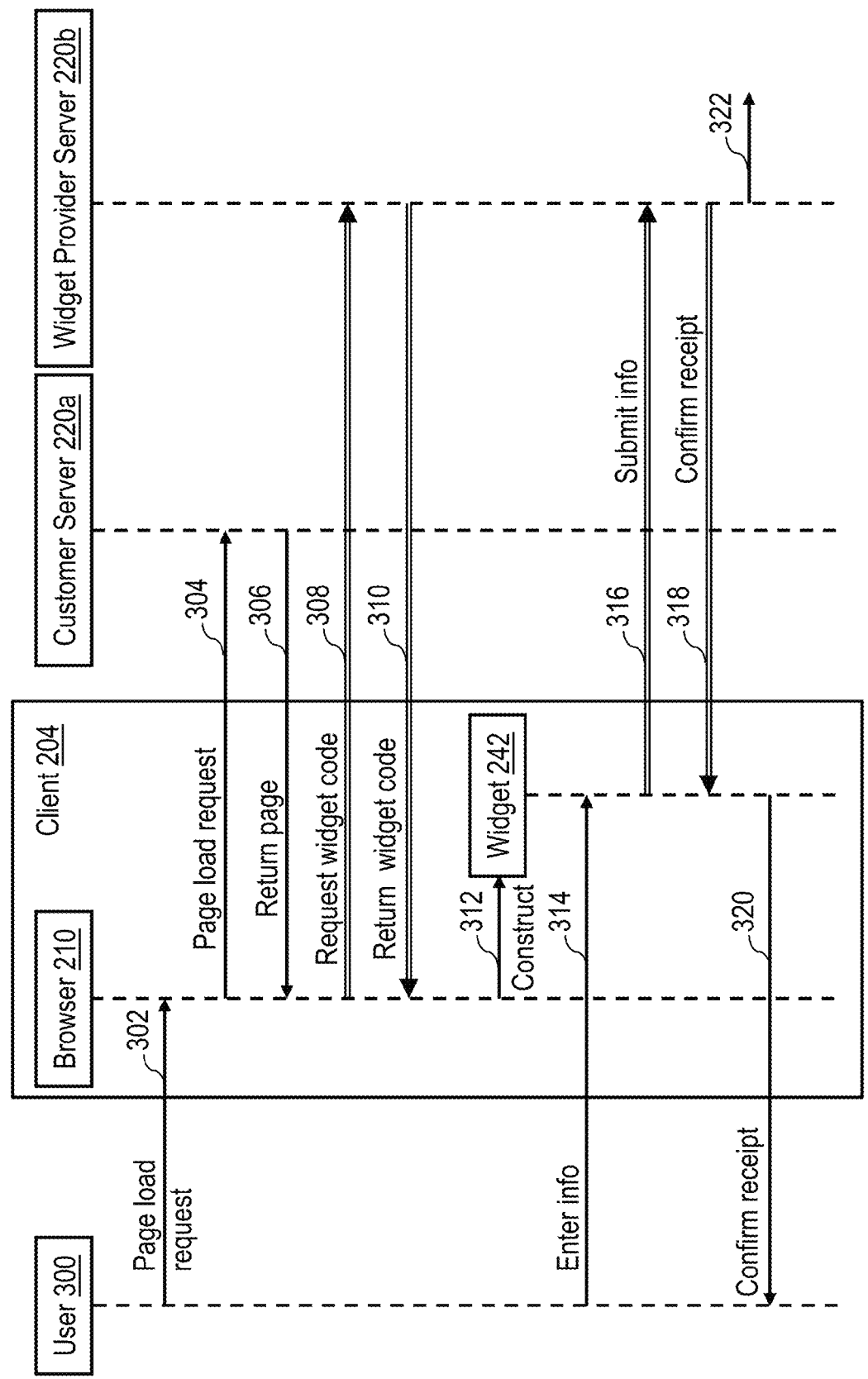
FIG. 3 is a sequence diagram of an exemplary process of communicating information via a secure widget in a web page in accordance with one embodiment.

Referring now to FIG. 3, there is depicted a sequence diagram illustrating an exemplary sequence of communication within the exemplary network environments of FIGS. 2A-2B. Chronological time is illustrated proceeding from the top to the bottom of FIG. 3.

The sequence of communication begins when a user 300 enters a page load request 302 into browser 210 of client device 204, for example, by entering a desired Uniform Resource Locator (URL) or IP address into browser 210, by selecting a link in a web page, or by selecting a search result presented by browser 210. In response to the page load request 302 of user 300, browser 210 issues a corresponding page load request 304 (e.g., an HTTP GET) requesting a copy of web page 240a from customer server 220a via network 202. In response to page load request 304, web server 230a on customer server 220a returns web page 240a to browser 210 on client device 204 via network 202 as indicated at reference numeral 306. As delivered to browser 210, web page 240a includes a reference to widget 242a.

In response to receipt of web page 240a, browser 210 renders web page 240a within a display 212 of client device 204. In addition, browser 210 utilizes the reference to widget 242a to securely request the code of widget 242a, for example, from widget provider server 220b, as indicated at reference numeral 308. (In FIG. 3, secure communication is indicated by double lines). In response to widget code request 308, web server 230b on widget provider server 220b securely serves the code of widget 242a to browser 210, as indicated at reference numeral 310.

In response to receipt of the code of widget 242a by browser 210, browser 210 executes the code of widget 242a to construct a presentation of widget 242a within web page 240a by client 204, as indicated at reference numeral 312. In one embodiment, the presentation of widget 242a includes a payment web page 244a through which user 300 may make an online payment, as discussed above with reference to FIG. 2B. In other embodiments, such as that illustrated in FIG. 2A, other information is securely communicated to browser 210 and displayed in the presentation of widget 242a. Importantly, the context experienced by user 300, which is determined by the web page 240a presented to the user within display 212, remains unchanged when widget 242a is constructed within web page 240a.

Once browser 210 has rendered the presentation of widget 242a and, if applicable, payment web page 244a, user 300 may enter information, including without limitation, payment information, private information, personal information, and/or confidential information, into the presentation of widget 242a. If payment information is entered into payment web page 244a, the payment information generally includes a payment amount and at least one payment identifier, such as a credit card number or a bank routing number and bank account number, and may include additional information such as a user name or identifier, user physical or electronic mail address, etc. The indicated payment may be made in exchange for a good or service or may be a donation. In response to entry of the information into the presentation of widget 242a, widget 242 securely submits the payment information, for example, to widget provider server 220b, while retaining the user's context. Alternatively, widget 242 may submit the payment information to customer server 220a or alternative recipient. In some embodiments, payment information is only transmitted by widget 242a to a recipient associated with the server that sourced widget 242a. In other embodiments, such a restriction is not observed.

In response to receipt of the information, widget provider server 220b (or an alternative recipient of the payment information) optionally but preferably securely provides an update to widget 242a to confirm receipt of the information, as depicted at reference numeral 318. If the information includes payment information, the widget update depicted at reference numeral 318 serves to confirm completion of the payment. As shown at reference numeral 320, the presentation of widget 242a within web page 240a is accordingly updated to provide confirmation to user 300 while again preserving the user's context within web page 240a.

If payment information is received from widget 242a, widget provider server 220b or other recipient of the payment information may initiate one or more additional messages 322 via network 322 to collect the payment authorized by user 300. Such message(s) 322 can include, for example, transmission of the payment information to a financial institution or credit card company. Message(s) 322 can be sent before, after, or concurrently with the transmission of the update to the presentation of widget 242a depicted at reference numeral 318.

Figure 4A:
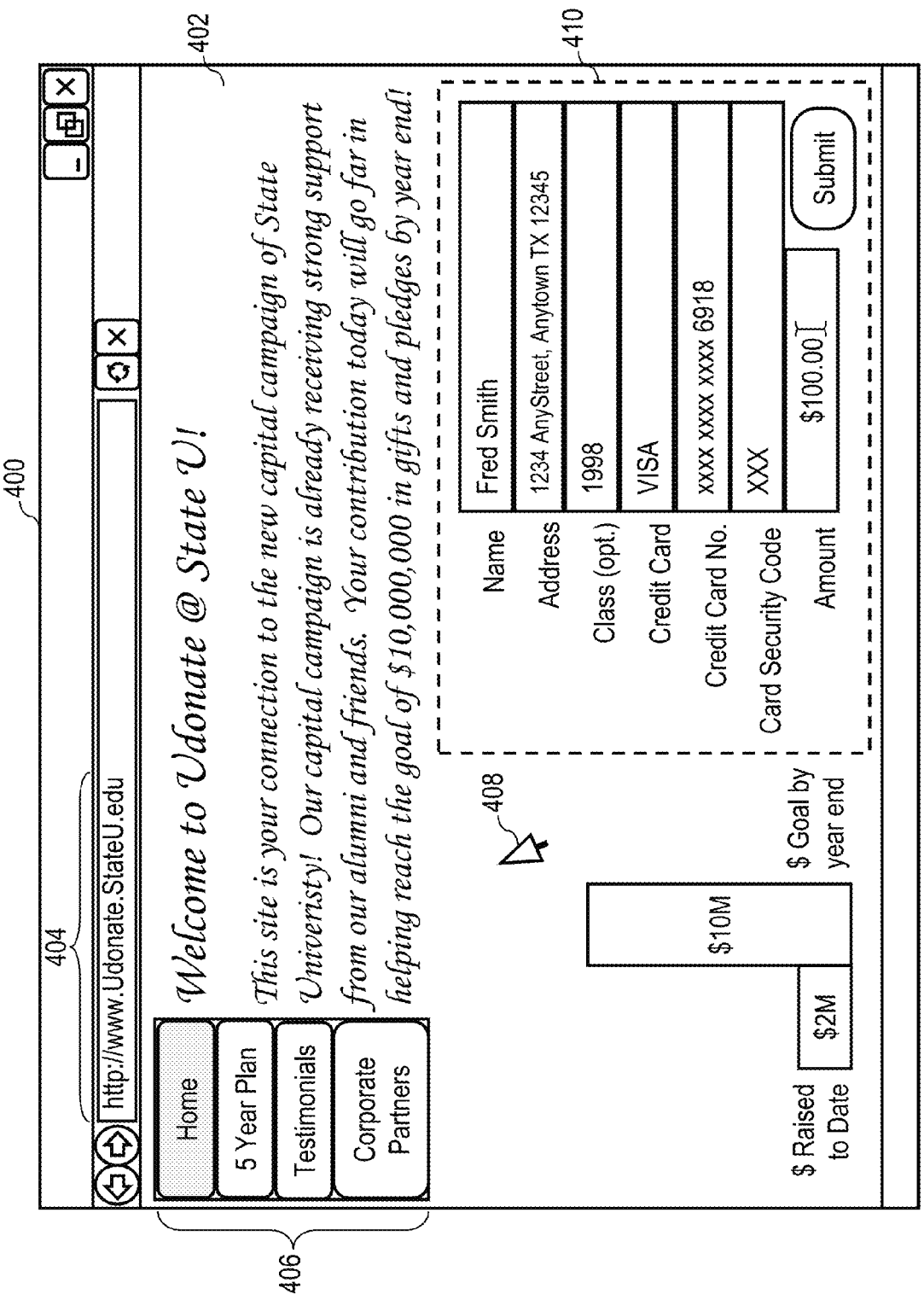
FIGS. 4A-4C depict views of a browser window containing a presentation of a secure payment widget through which an online payment is made in accordance with one embodiment.
Figure 4B:
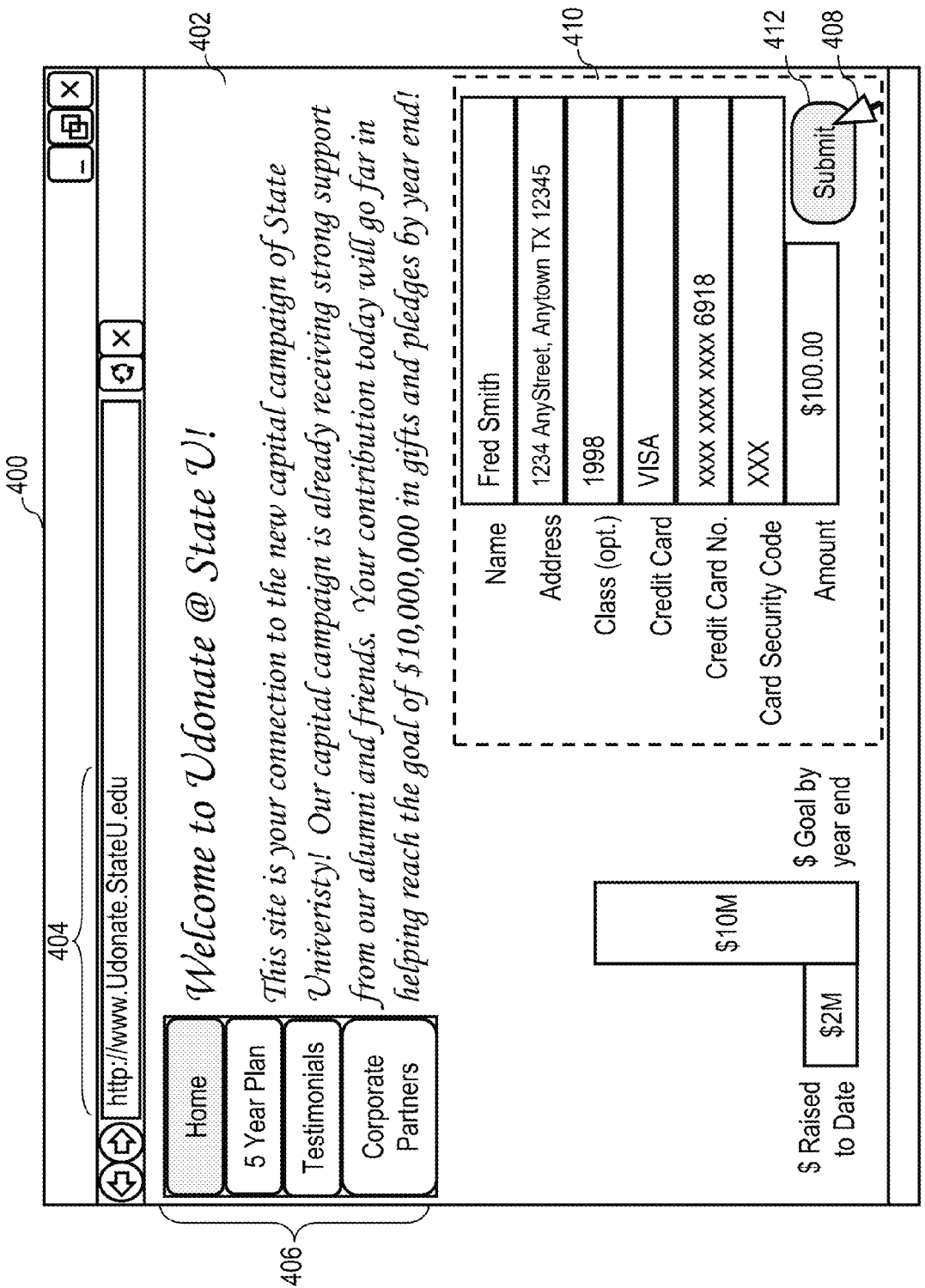
Figure 4C:
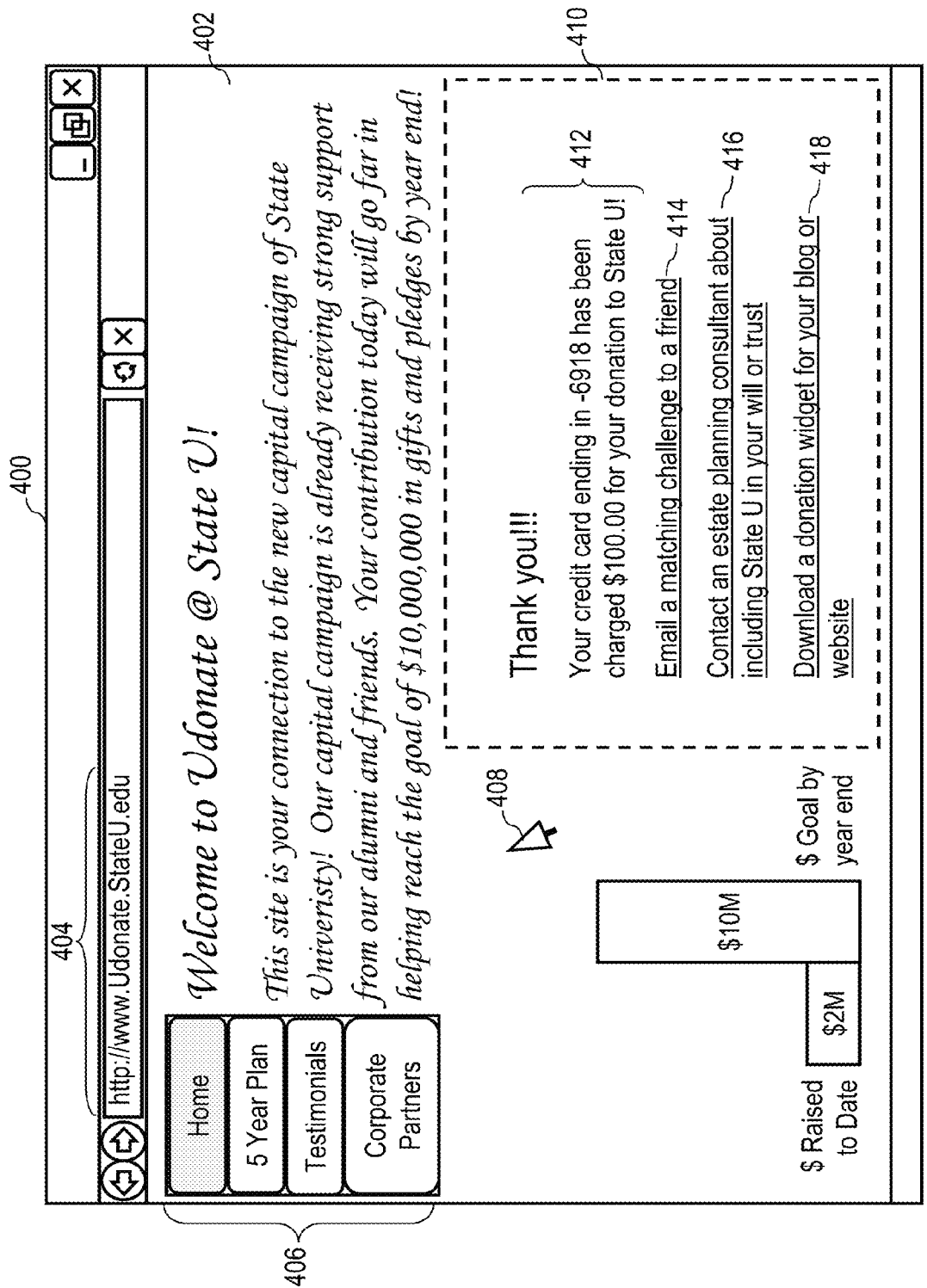

With reference now to FIGS. 4A-4C, there are illustrated views of an exemplary browser window 400 containing a presentation 410 of a secure payment widget 242 through which an online payment is made in accordance with one embodiment. In the depicted example, browser window 400 presents an exemplary web page 402 of a campaign web site describing a capital campaign for which donations are solicited. The web site includes multiple web pages to which a user can navigate utilizing a menu bar 406. The URL 404 of web page 402, which is presented in the address bar, defines a context for the user. In the depicted example, browser 210 connects to the server serving web page 402 utilizing an insecure protocol (e.g., HTTP).

Within web page 402, the browser presents presentation 410 of secure payment widget 242. Presentation 410 includes a payment web page (which in this case is coextensive with presentation 410 of widget 242) containing user-fillable fields related to a financial payment, which in this case is a donation to the advertised capital campaign. As shown in FIG. 4A, the user enters the payment-related information, including credit card information and a payment amount, into the fields of presentation 410. When at least all required information has been entered, the user initiates completion of the payment by manipulating an appropriate control within presentation 410, for example, by case selecting "submit" button 412 utilizing cursor 408, as shown in FIG. 4B.

As noted above with reference to FIG. 3, in response to entry of the payment information, widget 242 securely submits the payment information to a recipient, for example, widget provider server 220b, while retaining the user's context in web page 402. The recipient then optionally but preferably responds to the payment information by updating presentation 410 of widget 242 while retaining the user's context in web page 402. In the example illustrated in FIG. 4C, the recipient of the payment information updates presentation 410 with a confirmation message 412 confirming completion of the payment authorized by the user.

As further indicated in FIG. 4C, presentation 410 may optionally be updated with additional information, such as links 414-416. Links 414 and 416, if selected, invoke the presentation of an email editor with a default message. Widget link 418, if selected, invokes presentation of an interface through which the user can download a copy of widget 242 to a selected web page, thus facilitating viral distribution of widget 242.

Figure 5:
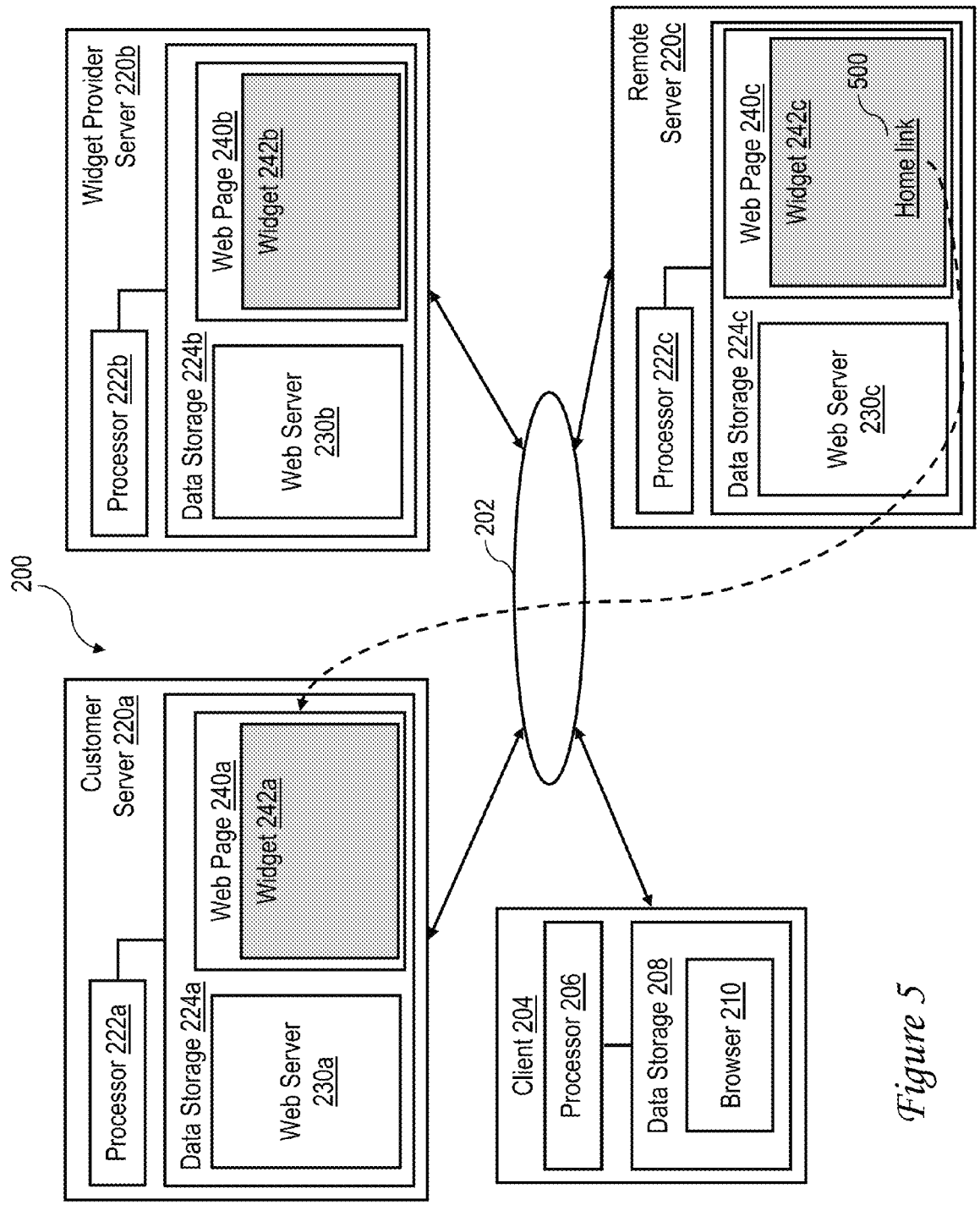
FIG. 5 is a high level block diagram of a network environment in which a secure widget includes a link redirecting to another website containing an instance of the secure widget in accordance with one embodiment.

Various modifications to the disclosed exemplary embodiments can be made. For example, because all communication of widget 242 is secure, information other than payment information can also be communicated securely to or from widget 242, even if protocol by which the underlying host web page is obtained is insecure. Further, in order to enhance the user's perceived sense of security, the presentation of widget 242 can additionally include an indicia of security, such as a lock icon, a text message, or a link to a separate web page explaining the security of widget 242. In addition, as illustrated in FIG. 5, the presentation of a secure widget 242c can include a home link 500, which if selected redirects browser 210 to a predetermined "home" instance of the same widget, in this case secure widget 242a within web page 240a on customer server 220a. The inclusion of home link 500 within the presentation of widget 242c thus enables a user to verify the authenticity of the association of the customer with instances of widget 242, which may be widely (and even virally) distributed to remote servers, such as remote server 220c.

As has been described, in at least one embodiment, a client device requests a web page via a network, where the web page is identified by an identifier and references a widget. In response to receipt of the requested web page, the client device requests the widget referenced by the web page and presents, within the requested web page, a presentation of the widget. Thereafter, in response to a user input via the presentation of the widget, information is transmitted via a secure connection between the widget on the client device and a server. The client device optionally presents confirmation of receipt of the information via the presentation of the widget while maintaining user context in the web page. Because communication with the widget is conducted securely and the user context is maintained during the process, user concerns regarding authenticity and security are addressed.

While one or more preferred embodiments have been described, it will be understood by those skilled in the art that various changes in form and detail may be made therein without departing from the spirit and scope of the invention. For example, although various computer system(s) executing program code that directs innovative operations have been described, it should be understood that such operations may be directed by a program product for use with a data processing system. The program product includes program code defining the operations and a data processing system readable storage medium that provides a physical medium to store, carry or encode the program code. It will be appreciated that a wide variety of media, which include, without limitation, non-rewritable storage media (e.g., CD-ROM or DVD-ROM) and rewritable storage media (e.g., a floppy diskette, hard disk drive, DVD, flash memory, etc.), can be employed. It should be understood, therefore, that such data processing system readable storage media, when carrying or storing program code that direct some or all of the described operations, represent alternative embodiments.

In addition, it should be appreciated that although an exemplary network environment has been described herein, various embodiments may employ communication via any of a variety of networks, including without limitation, IP, Ethernet, wireless, and/or cellular, etc. Further, it should be appreciated that the term "browser" as utilized herein is not limited to a conventional browser executing on a personal computer systems (e.g., Internet Explorer or the like), but instead includes smart phone browser applications and any other application that is capable of rendering a web page.

What is claimed is:

1. A program product, comprising:
   a data processing system-readable storage device; and
   server program code stored within the data processing system-readable storage device and executable by a server computer system, wherein the server program code is configured to cause the server computer system, responsive to receipt of a request for the widget, to return the widget to a client device and thereafter communicate information via a secure connection between the server computer system and the widget executing on the client device to capture, within a presentation of the widget, user information while maintaining user context at the client device in a particular web page in which the widget displays the presentation at the client device, wherein the server program code, in response to initiation of the secure connection by the client device, employs the secure connection to receive from the widget user information captured within the presentation of the widget.

2. The program product of claim 1, wherein the user information includes at least one of a set including payment information, private information, personal information, and confidential information.

3. The program product of claim 1, wherein the user information includes a user identifier.

4. The program product of claim 1, wherein the server program code is further configured to cause the server computer system to serve the particular web page to the client device utilizing an insecure communication protocol.

5. The program product of claim 1, wherein the server program code is further configured to cause the server computer system to confirm receipt of the user information via the widget on the client device while maintaining the user context.

6. The program product of claim 5, wherein the server program code is further configured to cause the server computer system to confirm receipt of the user information by modifying the presentation of the widget presented at the client device.

7. The program product of claim 1, wherein:
   the server program code is further configured to cause the server computer system, responsive to receiving from the widget the user information captured within the presentation of the widget, to cause modification of the presentation of the widget to include a selectable element; and
   the server program code is further configured to cause the server computer system, responsive to receiving from the widget an indication that the selectable element has been selected, to permit a download operation.

8. The program product of claim 1, wherein:
   the user information includes payment information; and
   the server program code is further configured to cause the server computer system to complete a financial transaction utilizing the payment information.

9. The program product of claim 8, wherein the financial transaction includes a user donation.

10. The program product of claim 1, wherein the request for the widget comprises a secure request for the widget.

11. The program product of claim 1, wherein the presentation of the widget comprises a dynamic presentation.

12. The program product of claim 1, wherein the user information includes an indication that the user has selected a selectable element within the presentation of the widget that acknowledges a transaction is to be performed.

13. The program product of claim 1, wherein the server program code is configured to cause the server computer system to maintain user context of the client device in the particular web page during updates to the presentation of the widget.

14. The program product of claim 1, wherein the server program code is further configured to provide a link facilitating viral distribution of the widget.

15. A method of data processing, comprising:
   a client device requesting a web page via a network, wherein the web page is identified by an identifier and references a widget;
   following receipt of the requested web page, the client device requesting the widget referenced by the requested web page and presenting, within the requested web page, a presentation of the widget; and
   thereafter, in response to receiving user information within the presentation of the widget, the client device communicating the user information to a server via a secure connection between the widget on the client device and the server while maintaining user context at the client device in the requested web page, wherein the secure connection is initiated by the client device and employs a secure communication protocol implemented by the widget.

16. The method of claim 15, wherein the user information includes at least one of a set including payment information, private information, personal information, and confidential information.

17. The method of claim 15, wherein communicating user information includes the client device transmitting a user identifier.

18. The method of claim 15, wherein maintaining user context includes maintaining the user context in the web page such that the identifier is presented at the client device during communication of the information via the secure connection.

19. The method of claim 15, and further comprising presenting confirmation of receipt of the user information by modifying the presentation of the widget presented at the client device in response to a confirmation message received from the server.

20. The method of claim 15, and further comprising the browser receiving the web page from the server utilizing an insecure communication protocol.

21. The method of claim 15, and further comprising:
in response to receiving from the server a confirmation message, the client device modifying the presentation of the widget to include a selectable element; and
in response to selection of the selectable element within the presentation of the widget, the client device requesting a download operation.

22. The method of claim 15, wherein the user information includes payment information for a financial transaction.

23. The method of claim 22, wherein the financial transaction includes a user donation.

24. The method of claim 15, wherein the client device requesting the widget includes the client device requesting the widget utilizing a secure request.

25. The method of claim 15, wherein presenting, within the requested web page, the presentation of the widget includes presenting, within the requested web page, a dynamic presentation of the widget.

26. The method of claim 15, wherein the user information includes an indication that the user has selected a selectable element within the presentation of the widget that acknowledges a transaction is to be performed.

27. The method of claim 15, wherein maintaining user context at the client device in the requested web page includes maintaining user context at the client device in the requested web page during updates to the presentation of the widget.

28. The method of claim 15, wherein:
the server comprises a widget provider server; and
the method further comprises:
the client device receiving the requested web page from a customer server different from the widget provider server; and
the client device receiving the widget referenced by the requested web page from the widget provider server.

29. The method of claim 15, wherein:
the server comprises a destination server; and
the method further comprises the client device receiving the widget referenced by the requested web page from a widget provider server different than the destination server.

30. The method of claim 15, wherein maintaining user context at the client device in the requested web page includes the client device maintaining user context in the requested web page to prevent vulnerability to non-trusted access.

* * * * *